March 12, 1963  K. H. JOHNS  3,080,575
TOP SLEEPER
Filed May 25, 1960  2 Sheets-Sheet 1
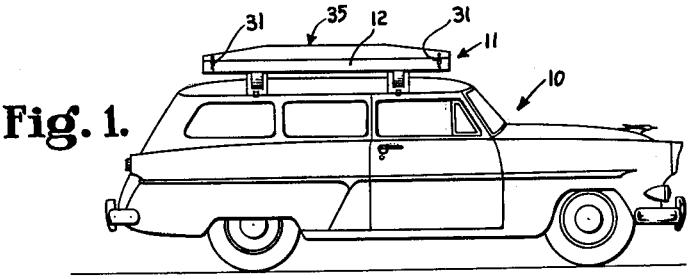
Fig. 1.
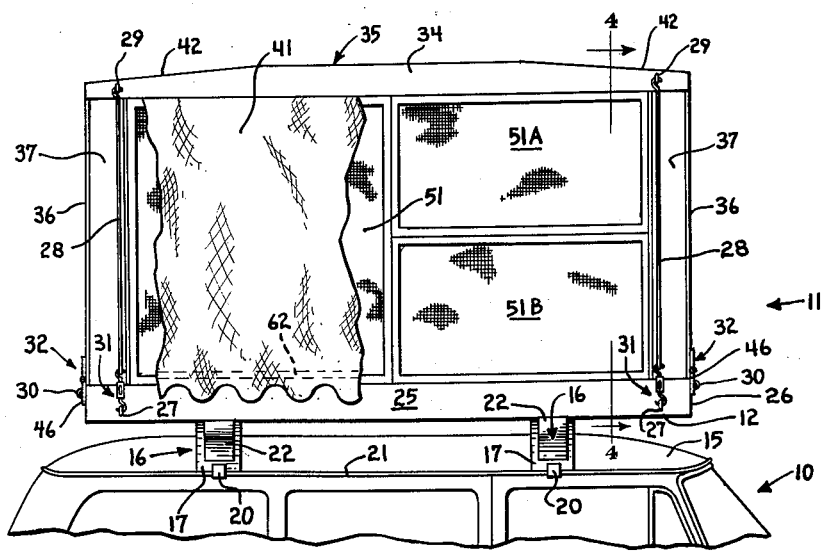
Fig. 2.
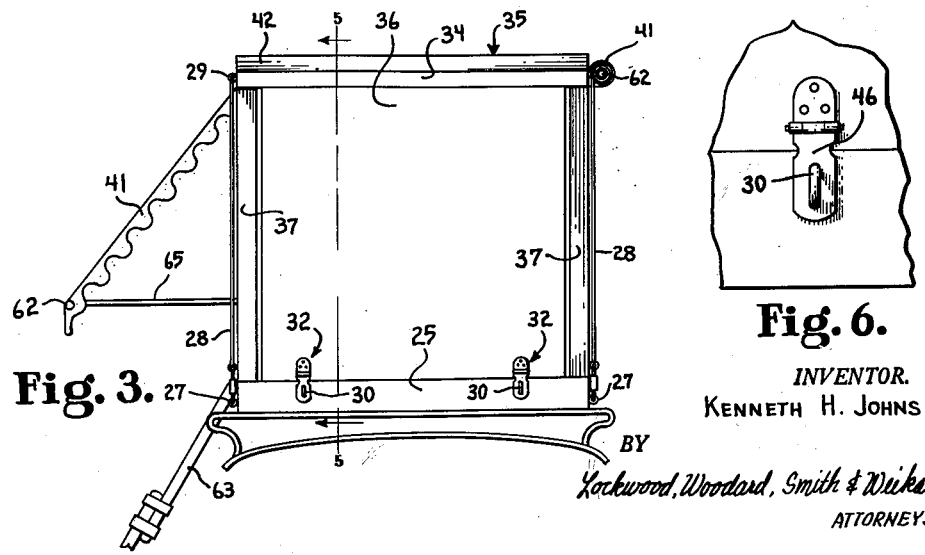
Fig. 3.
Fig. 6.
INVENTOR.
KENNETH H. JOHNS
BY
Lockwood, Woodard, Smith & Wickert
ATTORNEYS March 12, 1963 K. H. JOHNS 3,080,575
TOP SLEEPER Filed May 25, 1960 2 Sheets-Sheet 2

INVENTOR.
KENNETH H. JOHNS
BY
Lockwood, Woodard, Smith & Weikart
ATTORNEYS

United States Patent Office 3,080,575
Patented Mar. 12, 1963

3,080,575
TOP SLEEPER
Kenneth H. Johns, 4104 S. Brown St., Anderson, Ind.
Filed May 25, 1960, Ser. No. 31,586
2 Claims. (Cl. 5—119)

This invention relates to a sleeping compartment with foldable sides and a roof and which is mountable on top of a motor vehicle.

It is a primary object of the present invention to provide a sturdy sleeping compartment or bed which may be mounted or secured on top of an automobile having a solid top or upon other vehicles, and which may be quickly and easily opened for use on top of the vehicles or which may be quickly and easily collapsed to occupy a very thin flat space offering little air resistance while the vehicle is in motion.

A further object is to provide a sleeping compartment for the roof of an automobile, said compartment incorporating awnings and screens for the added comfort of the sleeper or user.

Another object of the invention is to provide a sleeping compartment which is convenient in use, is sturdy and strong when opened, yet is economical of manufacture, relatively simple, and of general superiority and serviceability.

Related objects and advantages of the invention will become apparent as the description proceeds.

One embodiment of the invention comprises a sleeping compartment suitable for mounting on the roof of an automobile, said compartment comprising a base and a roof for said base. There is also provided a pair of end walls mounted on the roof for pivoting to an upright position and to a position beneath the roof. The invention also includes means for securing the roof to the base with the end walls in an upright position and also for securing the roof to the base with the end walls pivoted beneath the roof.

The full nature of the invention will be understood from the accompanying drawings and the following description and claims:

FIG. 1 is a side elevation of an automobile having the sleeping compartment of the present invention mounted on the top thereof, the sleeping compartment being shown as in a closed traveling position.

FIG. 2 is a side elevation with certain portions broken away for clarity, of the sleeping compartment and the upper portion of the automobile of FIG. 1, and shows the sleeping compartment in an open position ready for use.

FIG. 3 is an end elevation of the structure of FIG. 2 additionally showing a ladder secured to the sleeping compartment and one awning of the compartment in an outwardly extending position and the other awning of the compartment in a rolled up position.

FIG. 6 is a fragmentary view of a base and an end wall forming a part of the structure showing the base and end wall secured together by a hasp.

Figure 4:
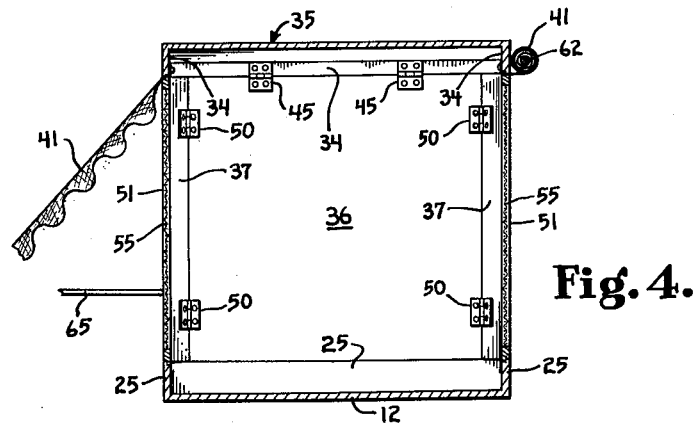
FIG. 4 is a transverse vertical section taken along the line 4—4 of FIG. 2 showing the compartment with the awnings arranged similarly to FIG. 3.
Figure 5:
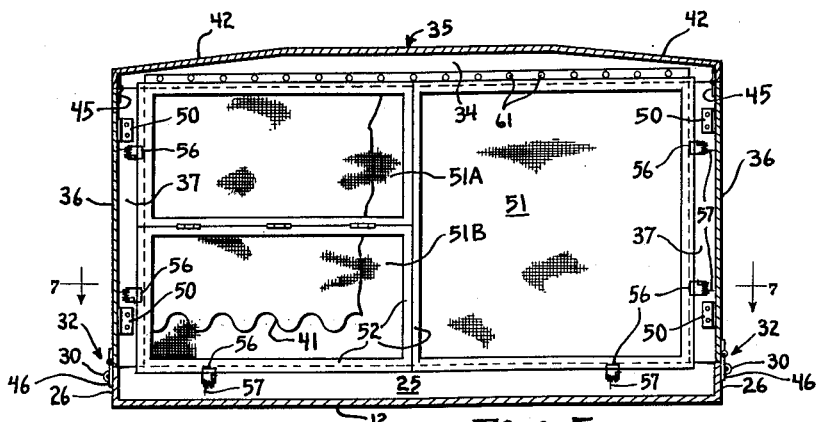
FIG. 5 is a longitudinal vertical section taken along the line 5—5 of FIG. 3 in the direction of the arrows.

Referring now more particularly to the drawings, there is illustrated an automobile 10 having the sleeping compartment 11 of the present invention mounted on the roof thereof. The compartment 11 comprises a base 12 which is secured to the top 15 of the automobile by means of conventional auto top supports 16 which include feet 17 engaging the roof of the automobile at the sides thereof, and locking means 20 which extend over the gutters 21 of the automobile and lock the supporting means 17 to the gutters. The supporting means 17 further includes beams 22 which extend transversely over the top of the automobile and have the base 12 fixed thereto.

The base 12 has an elongated rectangular shape and is provided with upturned elongated side portions 25 which are joined at their ends 26 forming a receptacle suitable for the reception of an air mattress or other suitable cushioning means. The base 12 also has fixed thereto a plurality of screw eyes 27 and loop portions 30 of hasps 32. The screw eyes 27 cooperate with turnbuckles 31, adapters 28 and screw eyes 29 to secure the roof 35 to the base 12. The roof 35 may be directly secured to and against the base 12 as in FIG. 1 by removing the adapters 28 and connecting toggle bolts 31 directly to screw eyes 29 which are threadedly fixed to roof 35. The loop portions 30 form a portion of hasps 32 which are used to secure end walls 36 to the base 12.

The roof or top 35 includes downturned, elongated side portions 34 which are joined at their ends to form a downwardly opening receptacle. When the sleeper is in the closed traveling position of FIG. 1 with the turnbuckles 31 holding the top 35 against the base 12, the various parts of the sleeper such as braces 37, screens 51 and awnings 41 may be placed between the roof 35 and base 12 and within the receptacle formed by the roof and base. The roof 35 may be formed of aluminum with Fiberglas lining or of any other suitable material and may be provided with cross bars (not shown) for increasing the strength thereof if so desired. It should be noted that the roof 35 has sloping top portions 42 which aids in streamlining the device when in traveling position and also causes the rain flow from the roof.

Figure 8:
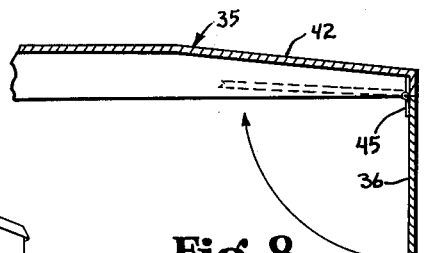
FIG. 8 is a fragmentary vertical longitudinal section similar to FIG. 5 but having certain portions thereof removed to clearly illustrate the operation of a representative one of a pair of end walls forming a portion of the structure.

Pivoted to the ends of the roof 35 by means of hinges 45 are the end walls 36. As is illustrated in FIG. 8, the end wall may be pivoted upwardly beneath the roof in order to allow the device to be placed in the position of FIG. 1. At the distal end of each end wall 36, the pivotal portion 46 of each of the hasps 32 is mounted and arranged to be received upon a respective loop 30 when the distal end of the end wall is resting on the upturned end of the base 12.

Each vertically extending side of each end wall 36 is provided with one of the elongated braces 37 which are secured to the end walls by means of hinges 50. When the top sleeper is in the closed position of FIG. 1, the braces 37 are pivoted inwardly against the end walls whereby the end walls may be pivoted upwardly to allow the top or roof 35 to completely cover the braces and end walls and to allow those parts to be completely enclosed by the receptacle formed by the roof and the base. It can be seen from an examination of FIG. 7 that the transverse dimension of each end wall 36 is substantially less than the width of either the base or the roof, thus allowing the end walls to be easily enclosed by the base and the roof.

The sleeping compartment is also provided with a pair of screens 51 which have sturdy frames 52 surrounding the screen wire portion 55 thereof. When the sleeping compartment is in a closed position, the screens are received between the roof and the base. However, when the sleeping compartment is set up and it is desired to prevent access of insects to the compartment, the screens are secured in place by means of arms 56 which are similar or identical to the pivotal arms of conventional mouse traps. The arms 56 are pivoted upon the inside of the longitudinal side portions of the base and roof and upon the braces 37 and are each provided with a coil spring 57 acting against the arm and against the surface upon which the spring is mounted to urge the arms against the screen.

Figure 9:
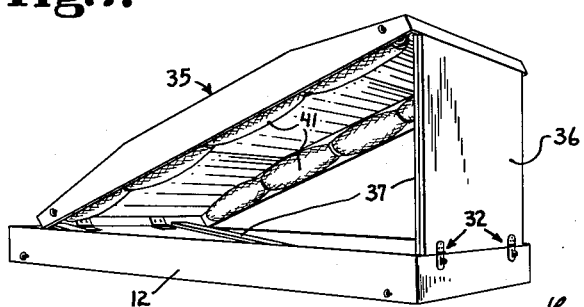
FIG. 9 is a perspective view of the top sleeper showing it in a partially set up position.

The sleeping compartment is also provided with the pair of awnings 41 which are attached to the inside surface of the roof side portions 34 by means of suitable fasteners 61. Each awning receives an elongated rod 62 in a closed fold at the distal end of the awning. Rod 62 provides means for maintaining the end of the awning in a straight and neat condition and acts as a weight facilitating the rolling and unrolling of the awning. Supports 65 may be pivotally mounted upon the vertical edges of the end walls and attached to the ends of rod 62 as illustrated re the leftward awning of FIG. 3. Also, the awning may be positioned as in FIG. 2 to completely cover the sides of the device providing added protection against rain and keeping warmth in the device or may be rolled up to a desired height as shown by the rightward awning of FIGS. 3 and 4. When the awnings are not in use and the device is collapsed, the awnings are placed within the roof as shown in FIG. 9. If desired, a ladder 63 is provided to allow easy access to the sleeping compartment. The screens 51 may be formed with portions 51A and 51B which are slidable or pivoted to allow entry and exit through the screens.

In order to set up the sleeping compartment of the present invention, the turnbuckles 31 are released and one end of the top 35 is lifted to the position of FIG. 9. The distal end of the end wall 36 at that end of the roof is supported on the transverse side portion 25 of the base in alignment therewith and the pivotal portions 46 of the hasps 32 are locked over loops 30 to secure the end walls to the base. The opposite end of the roof is raised in a similar manner and the same operations carried out in similar fashion.

Figure 7:
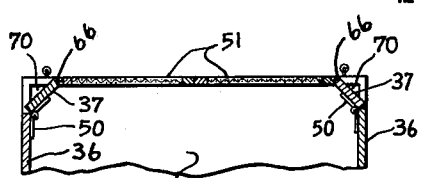
FIG. 7 is a reduced horizontal section taken along the line 7—7 of FIG. 5 and illustrating the position of certain braces forming a part of the structure which is shown in a set up condition.

The braces 37 are pivoted outwardly to the position of FIG. 7 wherein the portions of the transverse ends which are adjacent the distal ends 66 of the braces are engaging the longitudinal sidewalls 25 and 34 of the base and top, respectively. The compartment is finally secured in an open position by connecting the turnbuckles 31 to the screw eyes 27 and the adapters 28 to the screw eyes 29 and turnbuckles 31. The turnbuckles are tightened down to draw the roof 35 downwardly toward the base. The end walls 36 and braces 37 are thereby locked in place and themselves provide strength to resist any action of the wind to blow over or collapse the sleeping device. The screens and awnings are then adjusted as above described. It should be noted that the open corners 70 may be covered by water sealing material to prevent flow of rain into the base 12.

In order to collapse the device and prepare for traveling, the above procedure is reversed. It should be noted that the particular construction of the device allows it to be collapsed into a very thin flat shape offering very little wind resistance and yet to receive the various parts of the device therein. From the above description, it can be seen that the present invention provides an improved sturdy sleeping compartment for the roof of an automobile. It can also be seen that the present invention provides a sleeping compartment which may be quickly and easily set up and collapsed.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A compartment suitable for mounting on the roof of a vehicle, said compartment comprising an elongated rectangular base, an elongated rectangular roof for said base, a first rectangular wall having an end pivotally mounted on one end of said rectangular roof, a second rectangular wall having an end pivotally mounted on the other end of said rectangular roof, said walls being movable between extended and retracted positions such that said walls vertically support said roof when extended and are located underneath said roof when retracted, elongated braces pivotally mounted on said first and second rectangular walls and movable between retracted and extended positions, said elongated braces being disposed against said walls in a retracted position and movable through an arc of more than 90° but less than 180° to a position to engage said roof and said base for thereby providing an angular brace between said roof and said base, means for securing said walls to said base with said walls in an extended upright position, and means for securing said roof to said base when said walls are extended and when said walls are retracted.

2. A compartment suitable for mounting on the roof of a vehicle as described in claim 1 wherein a pair of screens are provided between said base and said roof, each of said screens abutting against said base and said roof as well as said elongated braces to enclose the side openings of said compartment.

References Cited in the file of this patent

UNITED STATES PATENTS

| | | |
|---|---|---|
| 2,596,438 | Rollings | May 13, 1952 |
| 2,710,977 | Fannin | June 21, 1955 |
| 2,727,252 | Wheeler | Dec. 20, 1955 |
| 2,729,497 | Runyan | Jan. 3, 1956 |
| 2,811,725 | Cence | Nov. 5, 1957 |